March 5, 1935. W. T. KANE Re. 19,486

THREAD GUIDE FOR KNITTING MACHINES

Original Filed Dec. 15, 1931

Inventor

Wilbur T. Kane.

By Augend & Stevens

Attorney

Reissued Mar. 5, 1935

Re. 19,486

UNITED STATES PATENT OFFICE 19,486

THREAD GUIDE FOR KNITTING MACHINES

Wilbur T. Kane, Philadelphia, Pa.

Original No. 1,939,501, dated December 12, 1933, Serial No. 581,219, December 15, 1931. Application for reissue June 1, 1934, Serial No. 728,629

6 Claims. (Cl. 66—126)

My invention relates to thread guides for knitting machines.

Heretofore, in hosiery knitting machines, thread guide arms have been secured to the carrier plates by means of headed screws passing through the carrier plate and engaging in threaded openings in the thread guide arm. When an arm had to be changed for any reason, it was a difficult task to remove the headed screws and the washers usually employed therewith without dropping the same into the machinery below the guide arms. In placing the new arm, additional difficulty and danger of dropping the screws or washers was encountered due to the necessity of alining the threaded openings in the arm with the ends of the screws after they have been inserted through the carrier plate.

This extreme difficulty and the attendant loss of time incurred when changing a thread guide arm results in the average knitter allowing defective guides to remain in the machine, thereby producing an imperfect product which results in great loss to large manufacturers.

With these difficulties in mind, it is an object of the present invention to provide an improved form of mounting for thread guide arms.

Another object of the invention is to provide a carrier plate with open ended slots and a guide arm with headed screws engaged in threaded openings therein whereby the screws may be slid into the slots while engaged with the arm and need not at any time be completely removed therefrom.

Another object of the invention is to provide means on the carrier plate which will prevent disengagement of the guide arm therefrom until the securing screws have been loosened to a predetermined position.

Other objects and advantages of the invention will become apparent during the course of the following detailed description when read in conjunction with the accompanying drawing which forms a part of this specification and in which, Figure 1 is a perspective view of a preferred embodiment of the invention;

Figure 1:
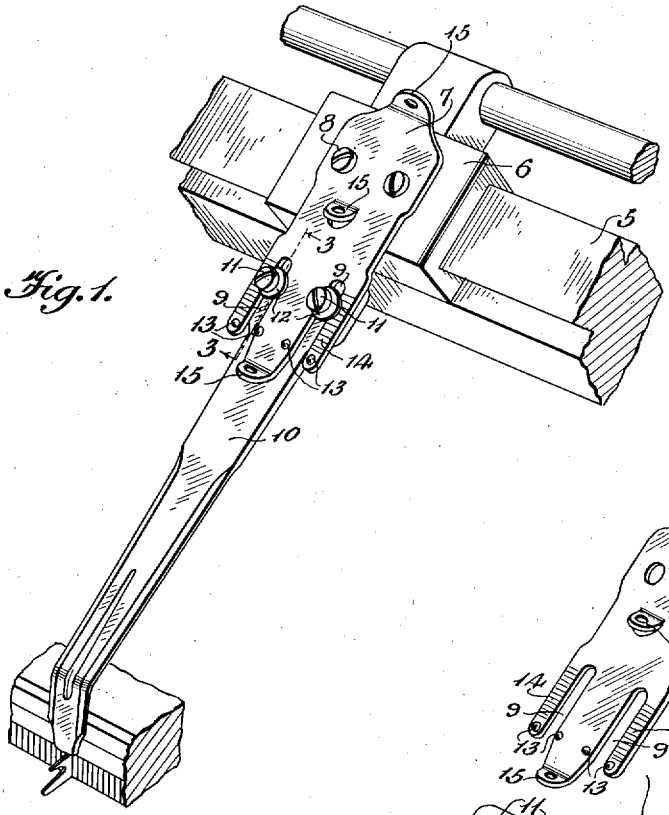
Figure 2:
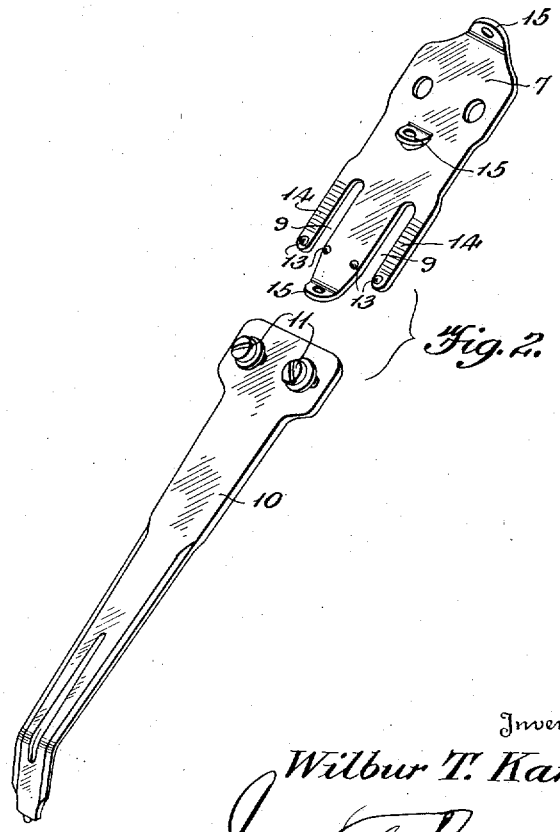
Figure 2 is a disassembled perspective view thereof.
Figure 3:
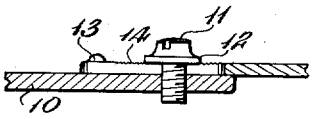
Figure 3 is a sectional view taken on the line 3—3 of Figure 1.

Referring now more particularly to the drawing, wherein like numerals refer to like parts throughout the same, 5 indicates a gib or cross bar of a knitting machine upon which is mounted a thread guide carriage 6. These parts are conventional and are not thought to require any further description.

A carrier plate 7 is mounted upon the guide carriage 6, being secured to the face thereof by means of suitable screws 8. This carrier plate is preferably flat and is formed with a pair of substantially parallel spaced open ended slots 9 which extend inwardly from the lower edge thereof.

A thread guide arm 10 is provided with spaced threaded openings in which are engaged headed screws 11, the openings being spaced apart the same distance, as the slots 9 so that the shanks of the screws between the heads thereof and the face of the guide arm 10 will slide into and out of said slots when said screws are loosened. The screws have clamping washers 12 soldered to the heads thereof, or if desired, the washers could be formed integral with said screws.

The above described arrangement of slots, screws and washers are, of course, illustrative of but one arrangement and it is obvious that the washers could be loosely mounted on the screw shanks, or dispensed with entirely. It is apparent also that the particular arrangement of slots could be varied as to number and position, as well as shape.

It is believed also that means other than screws could be used for affecting the connection. Any attaching element having a head and a shank portion capable of insertion in the slots would do as well.

The face of the carrier plate 7 is formed with projecting detents 13, one on each side of each of the slots 9 adjacent the open ends thereof, these detents acting to engage the washers 12 to prevent withdrawing of the screws 11 from the slots 9 until said screws have been loosened to a predetermined degree. The face of the plate may also be provided with serrations 14 on each side of the slots 9 so that the washers 12 will obtain a firmer grip when the screws 11 are tightened to lock the guide arm 10 in position. Of course, it is understood that the foregoing arrangement of detents and serrations illustrate but one way by which the desired result can be accomplished and it is obvious that the serrations or the like could as well be on the underside of the carrier plate, or on the meeting face of the guide arm or both or on the washers or like. Also, it is thought that other means than the detents 13 could be used to prevent the separation of plate and arm when the screws are loosened less than a predetermined amount. The plate 7 is also formed with perforated alined thread guide ears 15 at each end and intermediate thereof.

In operation, when it is desired to place a thread guide arm upon a carrier plate, the screws 11 are tightened until the ends thereof are flush with the back of the guide arm. When this is done there will be sufficient clearance between the washers 12 and the face of the arm to clear the detents 13 as the arm is inserted into position with the shanks of the screws 11 entering the slots 9, whereupon the screws are tightened to lock the arm in position. When it is desired to remove the arm for purposes of repair or replacement, the screws are loosened until their ends are flush with the back of the arm 10, which fact may be ascertained by holding the fingers of one hand over the ends of the screws while they are being loosened, and the arm is then slid out of engagement with the carrier plate.

In the illustrated form of the invention the detents 13 serve as stops to prevent the arm from falling loose from the plate if the screws 11 become accidentally loosened a small amount, but of course, other means could be used to accomplish the same result without departing from the spirit of my invention.

While a preferred embodiment of the invention has been shown and described, it will be understood that various modifications in the details of construction may be resorted to without departing from the spirit of the invention as defined in the appended claims.

Having thus described my invention, what I claim as new and desire to secure by Letters Patent is:

1. In a thread guide for knitting machines, a carrier plate having spaced open ended slots formed therein, a thread guide arm having headed screws engaged therein said screws being insertable endwise into said slots whereby to clamp said arm to said plate when said screws are tightened, and means for preventing accidental detachment of said arm from said plate upon a slight loosening of said screws, said means comprising detents carried by said plate on either side of each of said slots for engaging the heads of said screws.

2. In a thread guide mechanism for knitting machines, a carrier plate element, a thread guide element carried by said plate element, one of said elements having spaced open ended slots formed therein and the other of said elements having spaced headed screws engaged therein and insertable endwise of said slots, said screws serving to lock said elements together when so inserted and tightened, and means for engaging the heads of said screws to prevent accidental disengagement of said elements upon a slight loosening of said screws.

3. In a thread guide mechanism for knitting machines, a carrier plate element, a thread guide element carried by said plate element, one of said elements having spaced open ended slots formed therein and the other of said elements having spaced headed screws engaged therein and insertable endwise of said slots, said screws serving to lock said elements together when so inserted and tightened, and means for preventing accidental disengagement of said elements upon a slight loosening of said screws, said means comprising projections on the face of said slotted element adjacent the open ends of said slots for engagement with the heads of said screws.

4. In a thread guide mechanism for knitting machines, a carrier plate element, a thread guide element carried by said plate element, one of said elements having spaced open-ended slots formed therein and the other of said elements having spaced headed screws engaged therethrough and insertable end-wise of said slots, said screws serving to lock said elements together when so inserted and tightened, and means for engaging the heads of said screws to prevent accidental disengagement of said elements upon a slight loosening of said screws, said screws being of a length selected with respect to said engaging means so that when said screws are loosened to dispose their ends substantially flush with the under face of the element through which they are engaged, said heads will clear said head-engaging means to permit ready disengagement of said elements.

5. In a thread guide for knitting machines, a carrier plate element, a thread guide element carried by said plate element, one of said elements having spaced open ended slots formed therein and the other of said elements having spaced headed screws engaged therein and insertable endwise of said slots, said screws serving to lock said elements together when so inserted and tightened, and means to prevent disengagement of said two elements upon a slight loosening of said screws.

6. In a thread guide for knitting machines, a carrier plate element, a thread guide element carried by said plate element, one of said elements having spaced open ended slots formed therein and the other of said elements having spaced headed screws engaged therein and insertable endwise of said slots, said screws serving to lock said elements together when so inserted and tightened, clamp means carried by the shanks of said screws between the heads thereof and the slotted element, and means to prevent disengagement of said plate and arm upon a slight loosening of said screws.

WILBUR T. KANE.